United States Patent Office 3,816,558
Patented June 11, 1974

3,816,558
FILLED ALDEHYDE CONDENSATES HAVING
IMPROVED HEAT RESISTANCE
Rodney M. Huck, Longmeadow, Mass., assignor to
Monsanto Company, St. Louis, Mo.
Continuation of abandoned application Ser. No. 125,617,
Mar. 18, 1972. This application Jan. 18, 1973, Ser. No.
324,716
Int. Cl. C08g 37/16, 37/32
U.S. Cl. 260—838          12 Claims

ABSTRACT OF THE DISCLOSURE

Thermosettable compositions of a reactive filler and thermosettable resin of the aminoplast or phenoplast type. The filler is a devolatilized product of aromatic polycarboxylic compound, amine modified novolac resin and/or aromatic amine-aldehyde resin. Thermoset articles made from such compositions are characterized by improved (higher) service temperatures compared to the unfilled resin.

This is a continuation of application Ser. No. 125,617, filed Mar. 18, 1972, now abandoned.

BACKGROUND

Aminoplasts and phenoplasts have long been used as molding resins, particularly when in a powdered form. Characteristically, these resins offer good economics, good physical and electrical properties in molded bodies but suffer adversely from limited heat resistance characteristics, particularly when a molded body thereof is placed into a service environment where sustained or continuous elevated temperature exposure is involved. Phenoplasts stand moderately high continuous elevated temperature exposure (e.g. about 400–450° F. for the best heat resistant types), but at somewhat higher temperatures they tend to undergo rather rapid degradation, while aminoplasts similarly stand moderate but somewhat lower temperatures (e.g. about 350–400° F. for the best heat resistant types) and tend to undergo rather rapid degradation at somewhat higher temperatures, all as those skilled in the art fully appreciate.

Many efforts have been made to improve the heat resistance of phenoplasts and aminoplasts, such as by modifying the molecular structure of these resins and by use of refractory fillers having improved heat resistance characteristics. However, usually such prior art methods have not resulted in extending the heat resistant range much beyond the limits which have long been known in the art.

There has now been discovered a new family of resins which, when first prepared in the form of a filler (e.g. a powder, fiber, etc.) and then blended with a phenoplast, aminoplast, mixture thereof or cocondensates, results in a composition which, when molded into articles of manufacture, display surprisingly improved thermal stability characteristics especially under continuous elevated temperature service conditions. The starting resin (phenoplast, aminoplast, etc.) is of a conventional character and requires no special preliminary processing or modification.

The reason or reasons why these new moldable resin compositions display such surprising results when molded are not completely clear, though it is theorized (and I do not wish to be bound by theory) that the resinous filler is both reactive with the starting moldable resins and also imparts to the product blend of filler and resin superior molding flow characteristics of a character not believed generally possible by use of prior art fillers. Thus, while certain prior art fillers have been asserted to be reactive with such resin (aminoplasts, phenoplasts, etc.), and to improve molding flow characteristics of such resins, these known fillers simply do not characteristically improve product molded body heat resistance, and, indeed, in many instances are actually detrimental to thermal stability. Furthermore, such prior art fillers can additionally detract from other desired physical properties and cure characteristics of molded bodies. Examples of such prior art fillers are the naturally occurring resin containing products such as lignin, bagasse, bark, rosin, asphalts, and the like.

SUMMARY

The present invention relates to thermosettable molding compositions comprising a reactive filler and a thermosettable resin such that, in a molded body produced therefrom, the resin constitutes the continuous or matrix phase while the filler constitutes a discontinuous or dispersed phase. More specifically, the present invention is directed to thermosettable compositions comprising in combination (on a 100 weight percent total basis):

(A) From about 10 to 90 weight percent of a partially prereacted resin powder which is substantially in the form of particles under about 100 mesh and which is a resin formulation selected from the group consisting of (1) an amine-modified novolac resin and an aromatic polycarboxylic compound, and (2) an aromatic amine-aldehyde resin and an aromatic polycarboxylic compound, said resin formulation having been processed at temperatures of from about 200 to 600° F. (preferably from about 350 to 500° F.) so as to have a total volatiles content of not over about 4 percent based on total weight of said resin composition, and (B) The balance up to 100 weight percent of any given such molding composition being a thermosettable condensate selected from the class consisting of phenoplasts, aminoplasts, physical mixtures thereof, and co-condensates thereof.

Usually at the time of use (molding) a composition of this invention is in the form of a dry, free flowing powder whose particles are under about 100 mesh in average size, and, preferably, under about 170 mesh.

Optionally and preferably, at the time of use (molding) a composition of this invention is in the form of dry, free flowing systems comprising a composition as just described which is blended with from about 10 to 80 weight percent of a dry, particulate conventional, nonreactive (as respects such composition's components) filler which is thermally stable at temperatures of at least about 300° F. because such a system is more economical and permits one to make a wide variety of specialized types of molded bodies (such as brake shoes, fiber reinforced bodies, and the like.

Optionally, and preferably, a composition of this invention additionally contains up to about 20 weight percent (total weight basis) of a composition selected from the group consisting of aromatic amine-aldehyde resins, amine-modified novolac resins, or mixtures thereof. Also optionally, and preferably, a composition of this invention contains in addition up to about 20 weight percent (total weight basis) of an aromatic polycarboxylic compound.

The present invention is further directed to methods for making and using the herein described compositions and to molded and thermoset articles of manufacture produced therefrom.

DRAWINGS

The present invention is better understood by reference to the attached drawings wherein.

Figure 1:
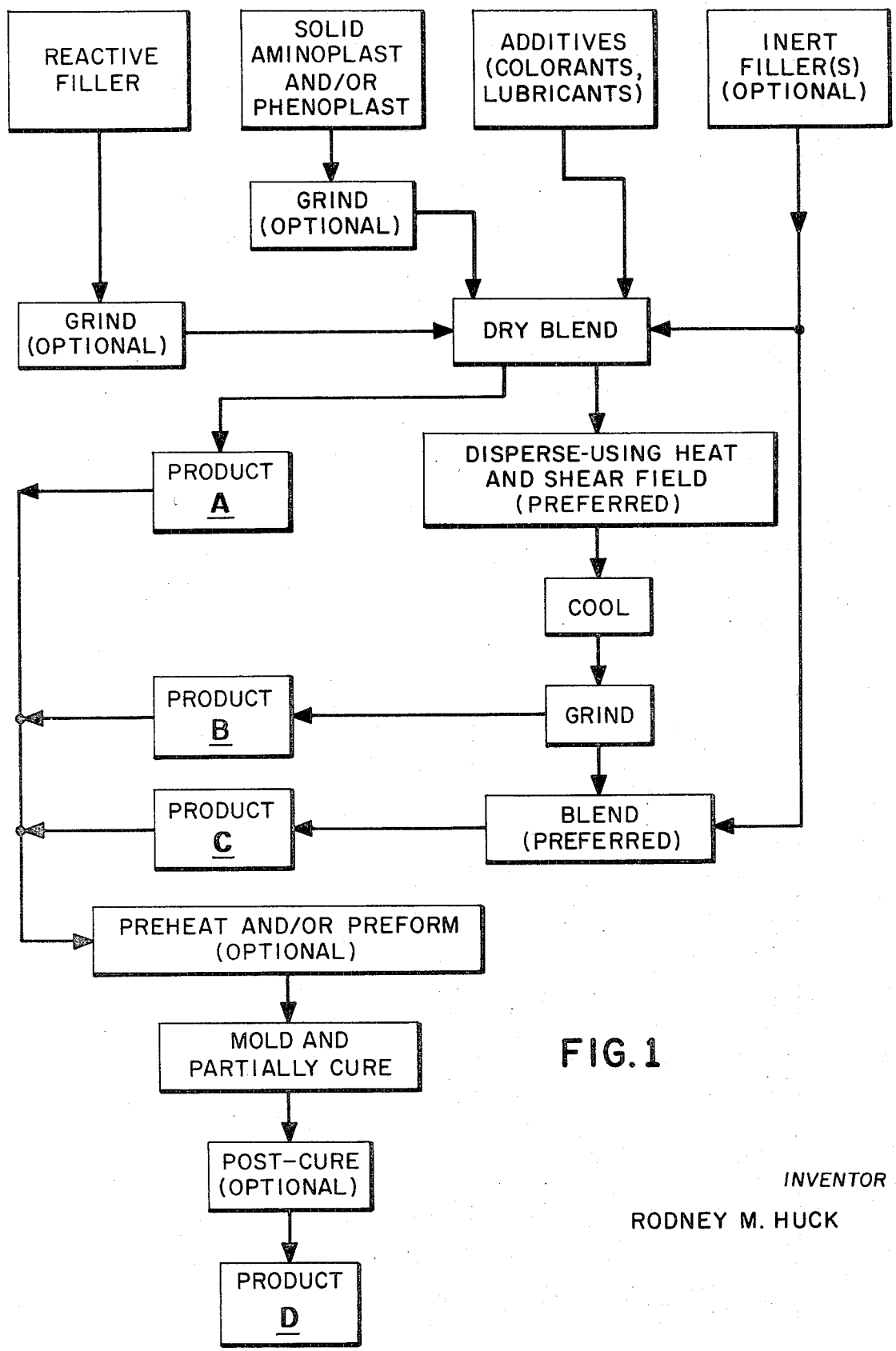
FIG. 1 is a flow sheet illustrating a preferred manufacturing procedure for practicing the present invention.

Referring to FIG. 1, a reactive filler (see box designated REACTIVE FILLER), a solid aminoplast or phenoplast resin or mixtures thereof (see box designated SOLID AMINOPLAST and/or PHENOPLAST), additive(s) (see box designated ADDITIVES (COLORANTS, LUBRICANTS, etc.)), and inert filler(s), which are optional but preferred ingredients in a starting composition (see box designated INERT FILLER(S) (OPTIONAL)) are dry blended together (see box designated DRY BLEND). As a preliminary, the reactive filler and/or the solid aminoplast or phenoplast or mixtures thereof, are ground, respectively, to some prechosen particle size (see boxes designated GRIND (OPTIONAL)). Next, the starting blend is subjected to a heat and shear field to disperse the reactive filler, inert fillers and additives in the aminoplast and/or phenoplast resin(s) (see box designated DISPERSE USING HEAT AND SHEAR FIELD (PREFERRED)). Because of the mixing action at the shear field, the components can be mixed during application of heat and shear. Under the relatively mild conditions of heat and shear, relatively little reaction takes place between the reactive filler and the resin(s) or the resin(s) with itself while a maximum of mixing takes place. Typical mild conditions of heat and shear involve temperatures ranging from about 100 to 250° F. and shear in the range from about 50 to 100 sec.$^{-1}$. Such relatively mild heat/shear conditions are conveniently provided by mill rolling, as, for example, by using a pair of differential rolls each about 5 inches in diameter where the front roll is heated to about 220° F. and the back roll is maintained at about 100° F. with the rolls revolving about 50–80 r.p.m. using a shear rate of about 50 to 100 sec.$^{-1}$.

To make a molding powder of this invention by a FIG. 1 sequence, one subjects a starting composition to these conditions at least for a time sufficient to achieve good dispersion and, in addition, for a time necessary to achieve the molding flow desired. Thereafter, it is preferred to cool the so-processed system to a temperature below about 75° F. so as to stop any further appreciable thermosetting action (see box labeled COOL). Next, this product is usually subjected to a grinding operation (see box labeled GRIND) to reduce average particle sizes therein for convenience in forthcoming molding operations. Finally, this product is usually admixed (see boxes labeled BLEND (PREFERRED)), if desired, with various additives, especially filler(s) to produce a molding powder ready for some particular end use application (see boxes labeled PRODUCT B and PRODUCT C). Alternatively, the starting composition resulting from dry blending only (see box labeled DRY BLEND) may be utilized as a molding composition ready for some particular end use application (see box labeled PRODUCT A).

Figure 2:
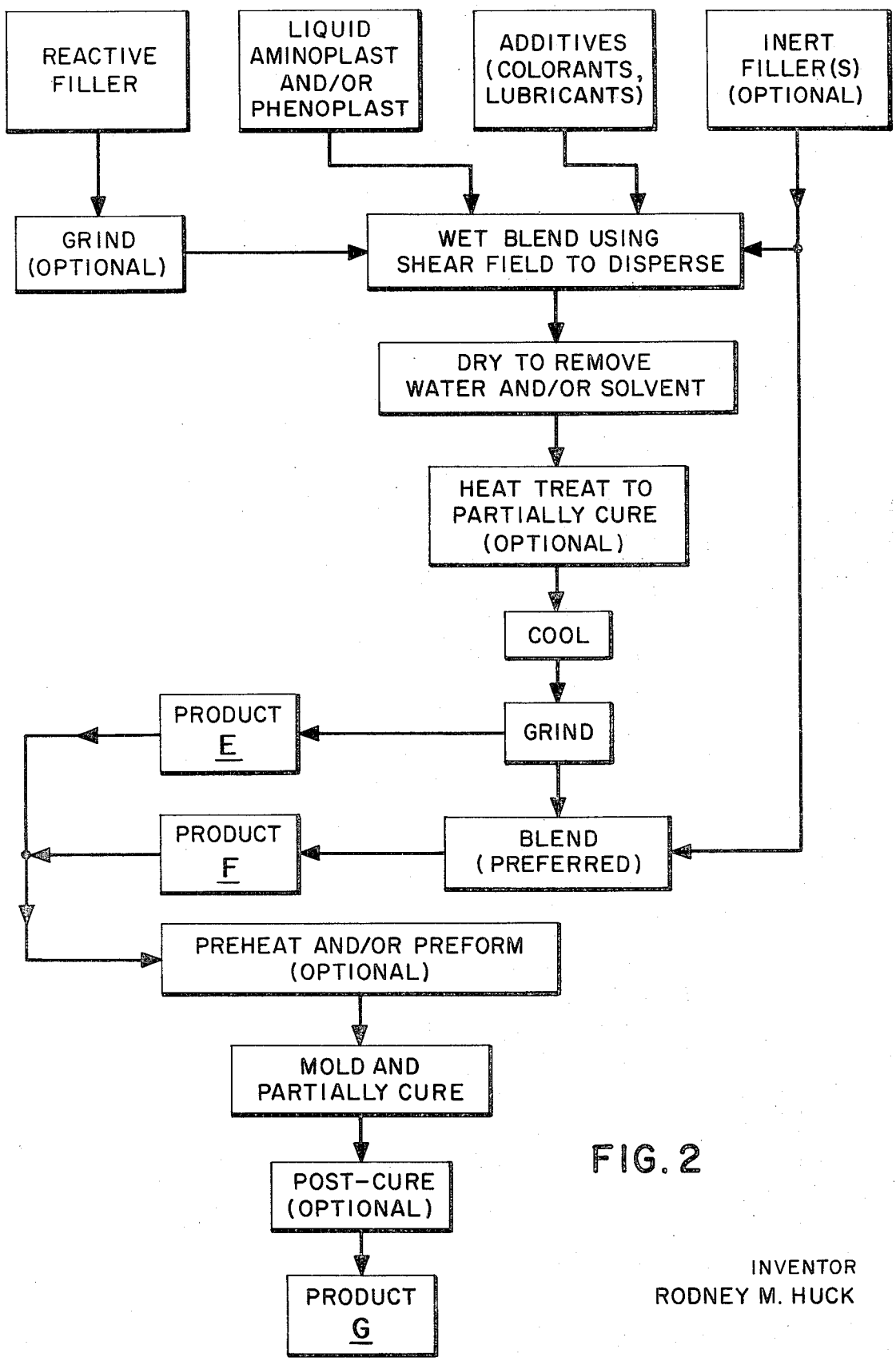
FIG. 2 is a flow sheet illustrating a preferred procedure for making certain preferred products of the present invention.

In FIG. 2, reactive filler (see box designated REACTIVE FILLER), liquid aminoplast or phenoplast resin or mixtures thereof (see box designated LIQUID AMINOPLAST and/or PHENOPLAST), additive(s) (see box designated ADDITIVES (COLORANTS, LUBRICANTS, etc.)), and inert filler(s), which are optional but preferred ingredients in a starting composition (see box designated INERT FILLER(S) (OPTIONAL)) are wet blended together (see box designated WET BLEND USING SHEAR FIELD TO DISPERSE). As a preliminary, the reactive filler is ground to some prechosen particle size (see box designated GRIND (OPTIONAL). Typical mild conditions of shear involve shear in the range of from about 25 to 75 sec.$^{-1}$ at ambient temperatures. Such relatively mild mixing conditions are conveniently provided by dough mixers, ribbon blenders, Baker-Perkins and various sigma-bladed mixers.

To make a molding powder of this invention by a FIG. 2 sequence, one subjects a starting composition to these conditions for a time sufficient to achieve good dispersion. Thereafter, it is dried to remove substantially all of the water and/or solvent introduced with the aminoplast/phenoplast liquid resin (see box designated DRY TO REMOVE WATER AND/OR SOLVENT). Typical drying conditions involve exposure to air temperature of from about 70 to 100° C. Such conditions are conveniently provided by air-circulating tray ovens, rotary ovens and the like. Alternately, drying can be carried out in the same equipment used to make the starting composition. Thus, heated mixers operating at atmospheric pressure or under vacuum can be used. The composition is additionally controlled by the extent of heat treatment so as to achieve the molding flow desired (see box designated HEAT TREAT TO PARTIALLY CURE (OPTIONAL)). Thereafter, it is preferred to cool the so-processed system to a temperature below about 75° F. so as to stop any further appreciable thermosetting action (see box designated COOL). Next, the product is usually subjected to a grinding operation (see box designated GRIND) to reduce average particle sizes therein for convenience in forthcoming molding operations. Finally, this product is usually admixed (see boxes labeled BLEND (PREFERRED)), if desired, with various additives, especially filler(s) to produce a molding powder ready to be molded for some particular end use application (see boxes labeled PRODUCT E and PRODUCT F).

PRODUCTS A, B, C, E and F are used by (1) molding (in which partial cure is effected), and, optionally, (2) post-curing (in which substantially complete thermosetting is effected). These operations are shown in FIGS. 1 and 2. Preheating and/or preforming are optional but preferred to achieve better molding (see box labeled PREHEAT AND/OR PREFORM (OPTIONAL)). After molding and, optionally, post-curing, the product is ready for some particular end use application (see boxes labeled PRODUCT D and PRODUCT G).

Details

In general, any amine-modified novolac resin known to the prior art may be employed in the practice of this invention. One preferred class of amine-modified novolac resins for use in the present invention is characterized by having:

(1) A number average molecule weight of from about 200 to 1,000, (2) At least two aryl moieties per molecule, the aryl nucleus of each aryl moiety containing from 6 through 10 carbon atoms each, (3) At least one divalent bridging moiety of the formula:

(1)

wherein $R_1$ and $R_2$ are each individually selected from the group consisting of hydrogen, lower alkyl, lower alkaline, lower halo-alkyl aryl of from 6 through 12 carbon atoms, haloaryl of 6 through 12 carbon atoms, and heterocyclic structures containing rings with 5 or 6 members each, each individual ring containing an oxygen, a sulphur, or a nitrogen atom, each such heterocyclic structure being bonded to the carbon atom of said bridging moiety, said bridging moiety having the unsatisfied valences of its carbon atom each bonded to a different one of said aryl moiety, (4) At least one —NH group per molecule, one bond of which is directly attached to one of said aryl nuclei and the other bond of which is attached to another of said aryl nuclei or to a radical $R_1$ as defined above, (5) At least one —OH group per molecule each such group being directly attached to a different one of said two aryl nuclei, (6) A percent oxygen acetyl of from about 3 to 26, and (7) A percent nitrogen acetyl of from about 3 to 26.

In general, however, any aromatic amine-aldehyde resin known to the prior art may be used in the practice of this invention. One preferred class of amine-modified novolac resins for use in the present invention is characterized by having:

(1) A number average molecular weight of from about 200 to 1,000, (2) At least two aryl moieties per molecule, the aryl nucleus of each aryl moiety containing from 6 through 10 carbon atoms each, (3) Less than 0.9 divalent bridging moieties per said aryl moiety of the formula:

(2)

wherein $R_1$ and $R_2$ are each individually selected from the group consisting of hydrogen, alkyl radicals of less than 5 carbon atoms. Each said bridging moiety having each unsatisfied valence of its carbon atoms each bonded to a different one of said aryl moieties, (4) Either at least one —NH group or at least one —$NH_2$, or both, per each resin molecule, one bond of which is directly attached to one of said aryl nuclei and the other bond of which is attached to another of said aryl nuclei or to a radical $R_1$ as defined above, (5) A number average of primary amine groups per said aryl moiety of less than about 0.99, and (6) A percent nitrogen acetyl of from about 10 to 30.

In general, a preferred class of aromatic amine-aldehyde resins has a primary amine ($H_2N$—) content smaller than about 95 mol percent and a secondary and tertiary combined amine (HN<) content greater than about 30 mol percent where 100 mol percent is the total amine content.

In general, any aromatic polycarboxylic compound known to the prior art may be employed in the practice of this invention. One preferred class of such compounds for use in the present invention is characterized by the general formula:

(3)

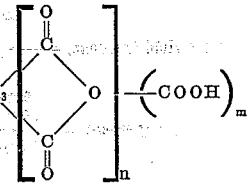

in which $R_3$ is an aromatic radical of three, four, five, or six valences and containing from 6 to 24 carbon atoms; $n$ is an integer of from 0 through 3; $m$ is an integer of from 0 through 6; and the sum of $2n+m$ is always equal to the valences of $R_3$.

Preferably $R_1$ and $R_2$ are both hydrogen, $R_3$ contains a single six membered aromatic ring or a benzophenone nucleus.

The reactive fillers used in the invention are prepared from aromatic polycarboxylic compound, aromatic amine-aldehyde resin and/or (as the case may be) amine-modified novolac resin by the teachings of copending U.S. patent applications Ser. No. 109,107 (C–06–12–0301) filed Jan. 25, 1971; Ser. No. 119,537 (C–06–12–0302) filed Mar. 1, 1971; Ser. No. 119,536 (C–06–12–0303) filed Mar. 1, 1971; and Ser. No. 119,514 (C–06–12–0304) filed Mar. 1, 1971. In general, a starting composition of aromatic polycarboxylic compound amine-modified novolac and/or aromatic amine-aldehyde resin, as taught in such applications, is heat processed (with or without shear) until the volatiles content of a system is below about 4 percent based on total weight of said so heat-processed composition.

For purposes of this invention, "oxygen acetyl percent" of an amine-modified novolac is conveniently determined by the method of Stroh and Liehr, J. Prakt. Chem. 29 (1–2), H. (1965).

For purposes of this invention, "total acetyl percent" of an amine-modified novolac is conveniently determined by the method of Siggia. Nitrogen acetyl percent is obtained by difference.

For purposes of this invention, total nitrogen acetyl percent of an aromatic amine-aldehyde resin is conveniently determined by the method of Sidney Siggia given in "Quantitative Organic Analysis," John Wiley & Sons, 3rd Ed. 1963 (by standard acetic acid anhydride and pyridine).

In general, a starting composition for use in this invention is in the form of a free-flowing powder. It is preferred to use an amine-modified novolac resin, and an aromatic polycarboxylic compound in the form of respective solids which have particle sizes generally under about 100 mesh (U.S. Standard sieves). More preferably, particle sizes under about 170 mesh are used. The admixing of one component with the other initially can be made in a blender, such as a so-called Waring Blender, a ball mill, mill roll, or the like, although any convenient mechanical mixing means may be employed.

For purposes of this invention, the term "thermoset" or "thermosetting" in reference to starting or product compositions of this invention indicates that a given thermosettable composition, after exposure to elevated temperatures for times sufficient to substantially completely react together substantially all of one of the two components depending upon which one is present in excess of stoichiometric amount) with the other component comprising a composition of this invention so as to produce a product which is not only substantially insoluble, but also is substantially infusible. For purposes of this invention, the term "substantially insoluble" in relation to "thermoset" or "thermosetting" has reference to insolubility (or extractability) in common organic solvent, such as methyl ethyl ketone, so that not more than about 10 weight percent of a given so thermoset product dissolves in such a solvent. Similarly, the term "substantially infusible" has reference to the fact that a given or thermoset product does not appreciably melt before decomposing when heated to elevated temperatures.

By the term "phenoplast" as used herein, conventional reference is had to a thermosettable resin system comprising condensate(s) of a phenol and an aldehyde, including resoles and novolacs (the latter being in combination with a curing agent such as hexamethylene tetramine or the like; the former characteristically being thermosettable as such). Phenoplasts and methods for their manufacture are well known to the prior art.

By the term "aminoplast" as used herein, conventional reference is had to a thermosettable resin system comprising condensate(s) of an amine and an aldehyde, including aromatic amine-aldehyde resins, urea-aldehyde resins and melamine aldehyde resins and etherified derivatives thereof. Catalysts or curing agents may be employed in combination with such a resin to comprise the resin system. Aminoplasts and methods for their preparation are well known to the prior art.

The art well appreciates that mixture of aminoplasts and phenoplasts may be formulated and used to make molding powders in any proportion suitable or desirable.

Co-condensates of such thermosettable resin systems are likewise well known to the prior art and may be prepared by many different means, whereby a phenol and an aldehyde and an amine are condensed together. Any reaction sequence, partial condensation scheme, or the like may be employed.

Because of the generally better heat stability characteristics associated with them, phenoplasts and amine-modified phenoplasts are preferred as starting materials for making compositions of this invention, while preferably, at the time of use (molding), a phenoplast, aminoplast, mixture thereof, or co-condensate thereof is in the form of a powder, as indicated above, it will be appreciated that, as indicated herein in reference to the Drawings, these starting thermosettable resin systems may be used as liquids which are converted to solids as a part of the procedure of preparing compositions of the present invention.

By the term "physical properties" as used herein, generic reference is had to such things as mechanical strength properties (flexural, impact, tensile, etc.), dimensional changes (during molding and in service, including molding, shrinkage, thermal coefficient of expansion, etc.), surface characteristics (e.g. good gloss, hard finish, wear resistant, good mold conformity, etc.), and the like.

To prepare the thermosettable molding compositions of this invention from the reactive filler and the thermosettable condensate, the respective components are simply admixed together by any convenient mixing means, typically either by dry blending or wet blending (see Figure description).

For example, the thermosettable condensate can initially be in the form of a solution of such condensate in a solvent or fluid carrier (water or organic liquid at room conditions). The inert filler is then mechanically dispersed in the fluid carrier with the dissolved condensate. The reactive filler is typically substantially insoluble in water and common organic solvents. Thereafter, the fluid carrier is evaporated in a drying operation to leave the desired composition, which then may be ground before use (molding) if desired.

Preferably, compositions of this invention are dry, as noted, by which reference is had to the fact that such a composition contains less than about 5 weight percent free water (based on total weight) and preferably less than about 1 weight percent thereof.

In a product thermosettable composition of this invention, there is preferably from about 40 to 80 weight percent of reactive filler (which is herein sometimes referred to as "partially prereacted resin powder," and more preferably from about 50 to 70 weight percent, with the balance in any given such composition up to 100 weight percent thereof being thermosettable condensate selected from the class consisting of phenoplasts, aminoplasts, physical mixtures thereof, and co-condensates thereof.

As indicated above, compositions of this invention can include a dry, particulate (e.g. below about 100 mesh), conventional, non-reactive filler which is thermally stable as indicated. Preferably, such bodies are not thermoplastic. Thus, typical fillers include glass bodies, especially short fibers, graphite powder, molybdenum disulfide powder, powdered metals (such as copper, bronze, aluminum, and the like), polytetrafluoroethylene powder, powdered minerals, including aluminiferous, calciferous, titaniferous, siliceous, etc. bodies (e.g. wollastonite, quartz, cryolite, barytes, silican carbide, aluminum oxide, etc.), and the like. The boron, carbon (graphite), metallic, etc. filaments and whiskers can likewise be used. When employing particulate solid diluent materials as conventionally done in making molding compositions, one can admix with a starting composition of this invention from about 10 to 80 weight percent (based on total starting composition weight) of particulate inert diluent and preferably from about 15 to 60 weight percent. In addition, a molding composition typically contains in addition from about 1 to 2 weight percent of a lubricant and from about 1 to 2 weight percent of a colorant, though relatively higher or lower percentages of these last indicated components may be present in a starting composition, as those skilled in the art will appreciate.

The thermosettable molding compositions of this invention may be molded by the procedures and equipment conventionally employed to mold phenoplast and aminoplast resins. Thus, typical molding conditions involve the use of temperatures ranging from about 325 to 400° F. and pressures of from about 2,000 to 10,000 though higher and lower temperatures and pressures may be employed without departing from the spirit and scope of this invention, as those skilled in the art will appreciate. Typical molding times range from about 10 to 200 minutes.

The resulting so-molded body can be thereafter substantially completely thermoset by subjecting same to temperatures ranging from about 300 to 600° F. preferably in a programmed sequence of increasing temperature increments of from about 25 to 50° F. each applied for 2 to 8 hours at each increment, said sequence being accomplished within a total time interval ranging from about 24 to 48 hours. Such a post-molding heat treatment produces a product molded body wherein the heat resistance properties are maximized.

EMBODIMENTS

The following examples are presented in illustration of this invention and are not intended as limitations thereof. Where "parts" are mentioned, parts by weight are intended unless otherwise indicated.

The following examples illustrate preparation of phenoplast and aminoplast resins:

EXAMPLE A

Preparation of Phenolic Resole Lump Resin 2500 grams (26.7 moles) of phenol and 2860 grams (35.2 moles) of 37 weight percent formalin are charged to a 3 gallon stainless steel reaction kettle equipped with a horseshoe agitator, thermometer, reflux condenser and necessary piping. The temperature is adjusted to about 35° C. 25 grams (0.08 moles) of barium hydroxide octohydrate dissolved in 50 grams of hot water are added, together with 100 grams (0.69 moles) of hexamethylenetetramine. The batch is heated to a 65° C. vacuum reflux (about 3.0 p.s.i.a.). It is maintained at 65° C. for about 2½ hours. At the end of the reflux time, the kettle is changed over to vacuum dehydration with the vacuum being increased slowly to about 1.5 p.s.i.a. The batch is dehydrated with the vacuum being increased to about 1.0 p.s.i.a. as the temperature rises to about 50° C. Dehydration is continued until the resin is grindable by test (usually at about 85–90° C. with 1.0 p.s.i.a. vacuum). When a sample of the resin is grindable (completely brittle at room temperature), the batch is poured into a pan to cool. A fan is used to cool the resin rapidly to room temperature. The resulting phenolic resole lump resin is an essentially clear, low melting solid at room temperature. The yield of solid resin is about 126 percent on the phenol charge.

EXAMPLE B

Preperation of Phenolic Novolac Lump Resin 1500 grams (16.0 moles) of phenol are heated in a 3-liter, 3-neck Pyrex reaction flask equipped with stirrer, thermometer, reflux condenser and dropping funnel. At about 95° C., 30 grams (0.24 moles) of oxalic acid dissolved in 60 grams of hot water are added. Next, over about a 2 hour period, 760 grams (12.6 moles) of 50 weight percent formalin are added to the reaction mixture. The temperature rises at first to about 110–115° C. after which is gradually drops to about 102° C. at the end of the addition. The reaction mixture is then refluxed for 4 hours at about 100–102° C. (atmospheric pressure). At the end of the reflux time, the reaction flask is changed over the vacuum dehydration and vacuum slowly applied up to 10 p.s.i.a. (temperature about 90° C.). As the temperature rises, the vacuum is increased step-wise until end conditions of 160° C. and 1.0 p.s.i.a. pressure are reached. At 160° C., the distillation is stopped and the batch poured into a pan to cool. The resulting phenolic novolac lump resin is clear solid at room temperature. The yield of solid resin is about 103 percent on the phenol charge.

EXAMPLE C

Preparation of Thermosettable Resin Powder From Example B 1000 grams of crushed phenolic novolac lump resin from Example B and 140 grams of hexamethylenetetramine are ground together through a laboratory Raymond mill (hammer mill) until essentially all of the material passes U.S. Sieve No. 140. It is then blended to insure uniformity. The product is a white resin powder. When a small amount is placed on a hot plate at about 320° F., this resin powder softens and then cures to a hard thermoset resin.

EXAMPLE D

Preparation of Thermosettable Resin Powder from Example A 1000 grams of crushed phenolic resole lump resin from Example A are ground through a laboratory Raymond mill (hammer mill) until essentially all of the material passes U.S. Sieve No. 140. It is then blended to insure uniformity. The product is a tan color resin powder. When a small amount is placed on a hot plate at about 320° F., this resin powder softens and then cures to a hard thermoset resin.

EXAMPLE E

Preparation of Thermosettable Varnish Resin From Example A 700 grams of crushed phenolic resole lump from Example A are dissolved in 300 grams of SD–30 alcohol to make a clear, amber colored varnish. When a small amount is placed on a hot plate at about 320° F., the resin cures to a hard thermoset resin.

EXAMPLE F

Preparation of Thermosettable Phenolic Liquid Resole Resin

Into a 1-liter, 3-neck reaction flask-equipped with a thermometer, stirrer and condenser are placed 300 grams (3.2 moles) of phenol and 300 grams (5.0 moles) of 50 weight percent formalin. The mixture is adjusted to 45° C. and 5.4 grams (0.13 moles) of flake sodium hydroxide are added. The mixture is heated to 65° C. and allowed to react for 3 hours at which time the free formaldehyde is about 3 percent as measured by the hydroxylamine hydrochloride method. The mixture is cooled to 35° C. and neutralized to a pH of about 7.3 with phosphoric acid. The resinous material is cooled and filtered to remove the salt. The resin, at this point, contains about 60 percent solids as measured by the Owens solids test. The resin is then dehydrated to about 75 percent solids by application at vacuum up to 1.0 p.s.i.a. and temperatures not exceeding 95° C. The product is a light colored resin solution of medium viscosity. When a small amount is placed on a hot plate at about 320° F., the resin cures to a hard thermoset resin.

EXAMPLE G

Preparation of Aromatic Amine-Modified Phenolic Resole Lump Resin 1600 grams (17.0 moles) of phenol and 2560 grams (31.6 moles) of 37 percent formalin are charged to a 3 gallon stainless steel reaction kettle equipped with a horseshoe agitator, thermometer, condenser, and necessary piping. The temperature is adjust to about 35° C. 16 grams (0.11 moles) of hexamethylenetetramine are added. Next, over about a 5 minutes period, 960 grams (10.3 moles) of aniline are added to the reaction mixture. The temperature rises rapidly to about 60° C., but then levels off. The reaction mixture is brought to air atmospheric reflux (temperature about 100° C.) and maintained at this temperature for 4 hours. At the end of the reflux time, the kettle is changed over a vacuum dehydration and vacuum slowly applied up to 10 p.s.i.a. (temperature about 90° C.). After about 1½ hours, the vacuum is increased so as to lower the temperature to about 80° C. (vacuum about 7 p.s.i.a.). As the temperature rises, vacuum is increased step-wise until 1.0 p.s.i.a. is obtained at about 85° C. Distillation is continued until the resin is grindable by test (usually at about 90–95° C. with 1.0 p.s.i.a. vacuum). When a sample of the resin is grindable (completely brittle at room temperature), the batch is poured into a pan to cool. A fan is used to cool the resin rapidly to room temperature. The resulting aromatic amine-modified phenolic resole lump resin is an essentially clear, amber-colored, low melting solid at room temperature. The yield of solid resin is about 185 percent on the phenol charge.

EXAMPLE H

Preparation of Thermosettable Resin Powder From Example G 1000 grams of crushed aromatic amine-modified phenolic resole lump resin from Example H are ground through a laboratory Raymond mill (hammer mill) until essentially all of the material passes U.S. Sieve No. 140. It is then blended to insure uniformity. The product is a yellow colored resin powder. When a small amount is placed on a hot plate at about 320° F., this resin powder softens and then slowly cures to a hard thermoset resin.

EXAMPLE I

Preparation of Melamine-Formaldehyde Liquid Resin

In a 2-liter resin kettle equipped with condenser and stirrer are placed 252 grams (2.0 moles) of melamine and 730 (9.0 moles) of 37 weight percent neutralized aqueous formaldehyde. The mixture is stirred and heated at reflux for 40 minutes. Dilution of a sample of the solution with an equal volume of water should give a precipitate of resin. The indicated resin, at this point, contains about 55 percent solids. It is then dehydrated to about 75 percent solids by application of vacuum up to about 1.0 p.s.i.a. and temperatures not exceeding 90° C. The product is an essentially colorless resin solution of medium viscosity. When a small amount is placed on a hot plate at about 320° F., the resin cures to a hard thermoset resin.

EXAMPLE J

Preparation of Melamine-Formaldehyde Powdered Resin

The undehydrated resin solution from Example I is converted to a solid product by spray drying. The spray dried product is then ground through a laboratory Raymond mill until essentially all of the material passes U.S. Sieve No. 140. The product is a white powder. When a small amount is placed on a hot plate at about 320° F., this resin powder softens and then cures to a hard thermoset resin. The following examples illustrate practice of the present invention:

EXAMPLE 1

Preparation of Unfilled Molding Powder from A Combination of (1) an Amine-Modified Novolac and an Aromatic Polycarboxylic Compound and (2) a Solid Phenolic Resole Part 1A 1,000 grams of resin from Example D, U.S. Pat. 3,558,559 and 920 grams of benzoyl tetracarboxylic acid dianhydride (BTDA) are ground together through a laboratory Raymond mill (hammer mill) until essentially all of the material passes U.S. Sieve No. 140. The product is a tan colored resin powder. Volatile content is determined by heating 3 grams in an air circulating oven at 600° F. for 10 minutes and calculating the percent weight loss. By this test, this resin powder shows approximately 8 percent volatiles. This resin powder is processed in a laboratory Banbury (Farrel Midget Mixer) under the following conditions:

Charge weight _____ 320–340 grams.
Jacket weight at start _____ 320° F. (steam heated).
Rotor speed _____ 95 r.p.m.
Ram air pressure _____ 80 p.s.i.
Mixing time _____ 2 minutes.

After about three-quarters of a minute of mixing, visible vapors are evolved (largely steam). The temperature of the charge is estimated to be about 350° F. at this point. The charge then becomes stiffer and is ground by the action of the rotors to a coarse powder before discharging. The temperature increases to about 460° F. before the end of the cycle. After cooling to room temperature, the coarse powder is ground through a laboratory Raymond mill until essentially all of the material passes U.S. Sieve No. 140. It is then blended to insure uniformity. By the volatile test given above, this unfilled molding powder shows approximately 1–1½ percent volatiles.

350 grams of this unfilled molding powder, 150 grams of resin powder from Example D and 2.5 grams of zinc stearate are processed on heated differential, 5 inch diameter mill rolls. The front roll is preheated to about 230° F., the back roll is maintained at about 110° F. A sheet is formed in less than one minute. It is cut from the rolls and re-passed 2 to 3 times before allowing to cool to room temperature (about 75° F.). The sheet is broken up and ground through a laboratory Raymond mill until essentially all of the material passes U.S. Sieve No. 140. It is then blended to insure uniformity. The product is a brown powder.

Part 1B

A ¼ inch thick 5 inch x 5 inch molded block is prepared from this molding powder by charging about 160 grams to a compression mold preheated to about 350° F. Molding pressure equivalent to 6,000–8,000 p.s.i. is applied. After 1 to 2 minutes, the mold is gas released (breathed) 1 to 2 times. The mold is heated under pressure over a period of about 30 minutes and the piece removed. The molding is dark brown in color with an excellent molded surface. It is rigid when hot, dimensonally stable without voids and is easily machined to any desired shape. A more complicated piece (threaded bottle cap) is easily molded under similar conditions except that the total cycle is reduced to about 2 minutes or less. This demonstrates that the molding powder so prepared has sufficient flow to mold at least relatively intricate part of high quality under essentially conventional phenolic molding conditions.

Part 1C

The above-molded block is cut into ASTM flexural strength test specimens. These pieces are post-cured by being heated in an air-circulating oven in accordance with the following schedule:

4 hours at 392° F.
4 hours at 428° F.
4 hours at 464° F.
4 hours at 500° F.
4 hours at 536° F.
2 hours at 554° F.

No blistering, cracking, or distortion or other undesirable such effects occur during post curing. The pieces are further exposed to temperatures in the range of 450–550° F. to demonstrate its excellent heat resistant characteristics. Heat aging properties of this unfilled material are shown in Table I below:

TABLE I

| Property | ASTM test No. | Value |
|---|---|---|
| Flexural strength: | | |
| Tested at 75° F. (post-cured only) p.s.i. | D-790 | 11,200 |
| Aged 500 hours at 500° F., p.s.i. | D-790 | 10,900 |
| Weight loss: Aged 500 hours at 500° F., percent | | 1.0 |

EXAMPLE 2

Preparation of Filled Molding Powder from a Combination of (1) an Amine-Modified Novolac and an Aromatic Polycarboxylic Compound and (2) a Solid Phenolic Resole 1,000 grams of resin from Example D, U.S. Pat. 3,558,559 and 920 grams of benzoyl tetracarboxylic acid dianhydride (BTDA) are ground together through a laboratory Raymond mill (hammer mill) until essentially all of the material passes U.S. Sieve No. 140. The product is a tan colored resin powder.

Volatile content is determined by heating 3 grams in an inert atmosphere (nitrogen gas) at 600° F. for 10 minutes and calculating the percent weight loss. By this test, this resin powder shows approximately 8 percent volatiles.

300 grams of this resin powder and 200 grams of graphite powder (Asbury #280H) are preblended. 200 grams thereof are placed in a suitable covered metal container, such as a 1 quart paint can. The container is then placed in an air-circulating oven maintained at about 600° F. for 45 minutes. During this period, preheated nitrogen is introduced through the cover to maintain an inert atmosphere at atmospheric pressure during the heating cycle. The maximum resin mix temperature achieved during the heating varies from about 500° F. near the center of the mass to about 600° F. adjacent to the inside of the can wall. At the end of 45 minutes, the container is taken from the oven, the cover removed and the contents allowed to cool to room temperature (about 75° F.). The resin powder charged is found to have changed to a considerably denser, partially sintered, resin mix cake black in color. It is broken up and ground through a laboratory Raymond mill until essentially all of the material passes U.S. Sieve No. 140. It is then blended to insure uniformity. The product is a black powder. Volatile content, as determined by the method given above is found to be about 0.5 to 1.0 percent.

375 grams of this filled molding powder and 125 grams of resin powder from Example D are ground together through a laboratory Raymond mill until essentially all of the material passes U.S. Sieve No. 140. It is then blended to insure uniformity. The product is a black powder. This material is molded and post-cured as in Example 1. It shows essentially the same good moldability and excellent heat resistance.

EXAMPLES 3–8

Following the same general procedure described in Example 1, a series of molding powders are prepared from a combination of (1) an amine-modified novolac and an aromatic polycarboxylic compound and (2) solid phenoplast and aminoplast resins. Table II below describes each molding powder.

TABLE II

| | 3 | 4 | 5 | 6 | 7 | 8 |
|---|---|---|---|---|---|---|
| Portion A: Amine-modified novolac/aromatic polycarboxylic compound (Ex. Nos.) | 1A | 1A | 1A | 1A | 2 | 2 |
| Portion B: Aminoplast/phenoplast resins (Ex. Nos.) | D | C | H | J | D | C |
| Ratio by weight of A to B | 1/1 | 1/0.54 | 1/0.67 | 1/0.33 | 1/0.43 | 1/0.50 |

EXAMPLES 9–15

Following the same general procedure described in Example 1, a series of molding powders are prepared from a combination of (1) an aromatic amine-aldehyde resin and an aromatic polycarboxylic compound, and (2) solid phenoplast and aminoplast resins. Table III below describes each molding powder.

Preparation of Aromatic Amine-Aldehyde Resin/
Aromatic Polycarboxylic Compound

9A

Aromatic-amine-aldehyde resin 500 grams (5.38 moles) of aniline, 300 grams of water and 538 grams (5.38 moles) of 37 percent hydrochloric acid are heated to 60° C. in a 3-liter, 3-neck Pyrex reaction flask that is equipped with stirrer, thermometer, reflux condenser and dropping funnel. Next, over a 2 to 3 hour period, 200 grams (3.33 moles) of 50 weight percent aqueous formaldehyde solution is added to the reaction mixture while stirring vigorously. The temperature of the reaction mixture is gradually increased so that at the end of the formaldehyde addition, the temperature is about 95° C. The reaction mixture is then refluxed for about 60 minutes at about 95° C. After cooling to about 60° C., 800 grams (6.0 moles) of 30 percent sodium hydroxide solution are added. This causes precipitation of the resin which is separated from the aqueous phase (decantation and/or filtration). The resin is then washed at least five times with 500 gram portions of warm water. The reaction flask is changed over to vacuum distillation conditions and the residual water and excess aniline are distilled off. At first, only about 7″ Hg of vacuum is applied (temperature about 90° C.). As the temperature reaches about 95° C., the vacuum is increased slowly to about 10″ Hg. As the temperature reaches about 100° C., the vacuum is increased slowly to about 20″ Hg. When the temperature reaches about 110° C., the vacuum is increased slowly to about 28″ Hg. The temperature is then allowed to rise with 28″ Hg vacuum to 200° C. while continuing to distill. At about 200 to 220° C., the distillation is stopped and the product poured into a pan to cool. The resulting aromatic amine-formaldehyde resin is a clear, low melting solid at room temperature.

Resin powder 1,000 grams of this resin and 1,600 grams of benzoyl tetracarboxylic acid dianhydride (BTDA) are ground together through a laboratory Raymond mill (hammer mill) until essentially all of the material passes U.S. Sieve No. 140. The product is a tan colored resin powder. Volatile content is determined by heating 3 grams in an inert atmosphere (nitrogen) at 600° F. for 10 minutes and calculating the percent weight loss. By this test, this resin powder shows approximately 9 percent volatiles.

This resin powder is then processed in a laboratory Banbury (Farrel Midget Mixer) under the following conditions:

Charge weight _____ 320–340 grams.
Jacket temperature at start _____ 320° F. (steam heated).
Rotor speed _____ 95 r.p.m.
Ram air pressure _____ 80 p.s.i.
Mixing time _____ 2 minutes.

After about three-quarters of a minute of mixing, visible vapors are evolved (largely steam). The temperature of the charge is estimated to be about 350° F. at this point. The charge then becomes stiffer and is ground by the action of the rotors to a coarse powder before discharging. The temperature increases to about 460° F. before the end of the cycle. After cooling to room temperature, the coarse powder is ground through a laboratory Raymond mill until essentially all of the material passes U.S. Sieve No. 140. It is then blended to insure uniformity. The product is a dark brown powder. By the volatile test given above, this unfilled molding powder shows approximately 1–1½ percent volatiles.

9B 850 grams of resin powder from 9A and 150 grams of graphite powder (Asbury #280H) are preblended. This powder is then processed in a laboratory Banbury (Farrel Midget Mixer) under the following conditions:

Charge weight _____ 340–360 grams.
Jacket temperature at start _____ 320° F. (steam heated).
Rotor speed _____ 95 r.p.m.
Ram air pressure _____ 80 p.s.i.
Mixing time _____ 2 minutes.

After about three-quarters of a minute of mixing, visible vapor are evolved (largely steam). The temperature of the charge is estimated to be about 350° F. at this point. The charge then becomes stiffer and is ground by the action of the rotors to a coarse powder before discharging. The temperature increases to about 460° F. before the end of the cycle. After cooling to room temperature, the coarse powder is ground through a laboratory Raymond mill until essentially all of the material passes U.S. Sieve No. 140. It is then blended to insure uniformity. The product is a black powder. By the volatile test given above, this filled molding powder shows approximately 1–1½ percent volatiles.

TABLE III

|  | 9 | 10 | 11 | 12 | 13 | 14 | 15 |
|---|---|---|---|---|---|---|---|
| Portion A: Aromatic amine-aldehyde resin/aromatic polycarboxylic compound (Ex. Nos.) | 9A | 9A | 9A | 9A | 9A | 9B | 9B |
| Portion B: Aminoplast/phenoplast resins (Ex. Nos.) | D | D | C | H | J | D | C |
| Ratio by weight of A to B | 1/0.43 | 1/1 | 1/0.50 | 1/0.67 | 1/0.33 | 1/0.43 | 1/0.50 |

EXAMPLE 16

Preparation of Unfilled Molding Powder from A Combination of (1) an Amine-Modified Novolac and an Aromatic Polycarboxylic Compound and (2) a Liquid Phenolic Resole 325 grams of amine-modified novolac/aromatic polycarboxylic compound molding powder from Example 1 and 233 grams of liquid resin from Example F are thoroughly mixed in a laboratory dough mixer, or by hand in a metal beaker or dish. The mass is then dried in a circulating air oven for 2–3 hours at 70–80° C. It is ground through a laboratory Raymond mill (hammer mill) until essentially all of the material passes U.S. Sieve No. 140. It is blended to insure uniformity. The product is a brown powder. This material is molded and post-cured as in Example 1. It shows essentially the same good moldability and excellent heat resistance.

EXAMPLES 17–22

Following the same general procedure described in Example 17, a series of molding powders are prepared from a combination of (1) an amine-modified novolac and an aromatic polycarboxylic compound and (2) liquid phenoplast and aminoplast resin. Table IV below describes each molding powder.

TABLE IV

|  | 17 | 18 | 19 | 20 | 21 | 22 |
|---|---|---|---|---|---|---|
| Portion A: Amine-modified novolac/aromatic polycarboxylic compound (Ex. Nos.) | 1A | 1A | 1A | 1A | 2 | 2 |
| Portion B: Aminoplast/phenoplast resins (Ex. Nos.) | F | F | E | I | E | F |
| Ratio by weight of A to B | 1/1.33 | 1/0.44 | 1/0.77 | 1/0.58 | 1/0.47 | 1/0.58 |

EXAMPLES 23-28

Following the same general procedure described in Example 21, a series of molding powders are prepared from a combination of (1) an aromatic amine-aldehyde resin and an aromatic polycarboxylic compound and (2) liquid phenoplast and aminoplast resins. Table V below describes each molding powder.

TABLE V

|  | 23 | 24 | 25 | 26 | 27 | 28 |
|---|---|---|---|---|---|---|
| Portion A: Aromatic amine aldehyde resin/aromatic polycarboxylic compound (Ex. Nos.) | 9A | 9A | 9A | 9A | 9B | 9B |
| Portion B: Aminoplast/phenoplast resins (Ex. Nos.) | F | F | E | I | E | F |
| Ratio by weight of A to B | 1/1.33 | 1/0.44 | 1/0.77 | 1/0.58 | 1/0.47 | 1/0.58 |

What is claimed is:

1. A thermosettable molding composition comprising:
(A) from 10 to 90 parts by weight of a partially reacted resin powder substantially in the form of particles under 100 mesh, composed of a thermosettable reaction product of an aromatic polycarboxylic compound and a polyamine resin selected from the group consisting of aromatic amine-modified novolacs and aromatic amine-aldehyde resins, said reaction product having been processed at temperatures in the range of 200 to 600° F. so that less than 4 percent of said reaction product is volatilized by further heating at 600° F.; wherein:
  (1) the aromatic polycarboxylic compound is characterized by the formula:

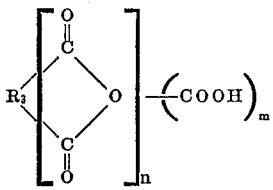

in which $R_3$ is an aromatic radical of three, four, five, or six valences and containing from 6 to 24 carbon atoms, $n$ is an integer of from 0 to 3, $m$ is an integer of from 0 to 6, and the sum of $2n+m$ is equal to the valence of $R_3$;
  (2) the aromatic amine-modified novolac is characterized by having: (a) a number average molecular weight of from about 200 to 1000, (b) at least two aryl moieties per molecule, the aryl nucleus of each aryl moiety containing from 6 through 10 carbon atoms each, (c) at least one divalent bridging moiety of the formula:

wherein $R_1$ and $R_2$ are each individually selected from the group consisting of hydrogen, lower alkyl, lower alkalene, lower halo-alkyl aryl of from 6 through 12 carbon atoms, haloaryl of 6 through 12 carbons atoms, and heterocyclic structures containing rings with 5 or 6 members each, each individual ring containing an oxygen, a sulphur, or a nitrogen atom, each such heterocyclic structure being bonded to the carbon atom of said bridging moiety, said bridging moiety having the unsatisfied valences of its carbon atom each bonded to a different one of said aryl moiety, (d) at least one —NH group per molecule, one bond of which is directly attached to one of said aryl nuclei and the other bond of which is attached to another of said aryl nuclei or to a radical $R_1$ as defined above, (e) at least one —OH group per molecule, each such group being directly attached to a different one of said two aryl nuclei, (f) a percent oxygen acetyl of from about 3 to 26, and (g) a percent nitrogen acetyl of from about 3 to 26; and
  (3) the aromatic amine aldehyde resin is characterized by having: (a) a number average molecular weight of from about 200 to 1000, (b) at least two aryl moieties per molecule, the aryl nucleus of each aryl moiety containing from 6 through 10 carbon atoms each, (c) less than 0.9 divalent bridging moieties per said aryl moiety of the formula:

wherein $R_1$ and $R_2$ are each individually selected from the group consisting of hydrogen, and alkyl radicals of less than 5 carbon atoms, each said bridging moiety having each unsatisfied valence of its carbon atom each bonded to a different one of said aryl moieties, (d) either at least one —NH group or at least one —NH$_2$, or both, per each resin molecule, one bond of which is directly attached to one of said aryl nuclei and the other bond of which is attached to another of said aryl nuclei or to a radical $R_1$ as defined above, (e) a number average of primary amine groups per said aryl moiety of less than about 0.99, and (f) a percent nitrogen acetyl of from about 10 to 30; and
(B) from 10 to 90 parts by weight of a thermosettable condensate selected from the group consisting of phenolic resole resins, phenolic novolacs in combination with hexamethylene tetramine, aromatic amine aldehyde resins, urea aldehyde resins, melamine aldehyde resins, etherified melamine aldehyde resins and co-condensates thereof.

2. A dry free-flowing formulation comprising 20 to 90 parts by weight of the composition of claim 1 blended with 10 to 80 parts by weight of a dry particulate filler which is thermally stable at temperatures of at least about 300° F.

3. A liquid composition of claim 1 wherein a said condensate is initially dissolved in a fluid carrier and a said resin powder is dispersed in said fluid carrier.

4. A molding composition produced by evaporating said fluid carrier from the composition of claim 3.

5. A composition of claim 4 wherein the said condensate therein is partially thermoset.

6. A composition comprising 80 to 100 parts by weight of the composition of claim 1 and from 0 to 20 parts by weight of a composition comprising an aromatic amine-aldehyde resin.

7. A composition comprising 80 to 100 parts by weight of the composition of claim 1 and from 0 to 20 parts by weight of a composition comprising an amine-modified novolac resin.

8. A composition comprising 80 to 100 parts by weight of the composition of claim 1 and from 0 to 20 parts by weight of a composition comprising an aromatic polycarboxylic compound.

9. A composition of claim 1 wherein said resin powder has a total volatiles content of not over ½ percent.

10. A composition of claim 1 wherein said resin powder has been processed at temperatures of from about 350 to 500° F.

11. The thermosettable molding composition of claim 1 comprising from 40 to 80 parts by weight of partially reacted resin powder and 20 to 60 parts by weight of thermosettable condensate.

12. The thermosettable molding composition of claim 1 comprising from 50 to 70 parts by weight of partially reacted resin powder and 30 to 50 parts by weight of thermosettable condensate.

References Cited

UNITED STATES PATENTS

| 3,347,808 | 10/1967 | Lavin et al. | 260—849 |
| 3,410,718 | 11/1968 | Smith | 260—838 |
| 3,558,559 | 1/1971 | Le Blanc | 260—51.5 |
| 3,207,652 | 9/1965 | Shannon | 260—838 |
| 2,542,484 | 2/1951 | Debing et al. | 260—839 |
| 2,526,885 | 10/1950 | Lindenfelser | 260—839 |
| 2,523,333 | 9/1950 | Schroy et al. | 260—840 |

FOREIGN PATENTS

| 425,871 | 3/1935 | Great Britain | 260—838 |

JOHN C. BLEUTGE, Primary Examiner

U.S. Cl. X.R.

260—839, 840, 841, 849